Nov. 10, 1970  D. C. QUICK ET AL  3,538,789
TRANSMISSION CONTROL
Filed Oct. 1, 1968  4 Sheets-Sheet 2

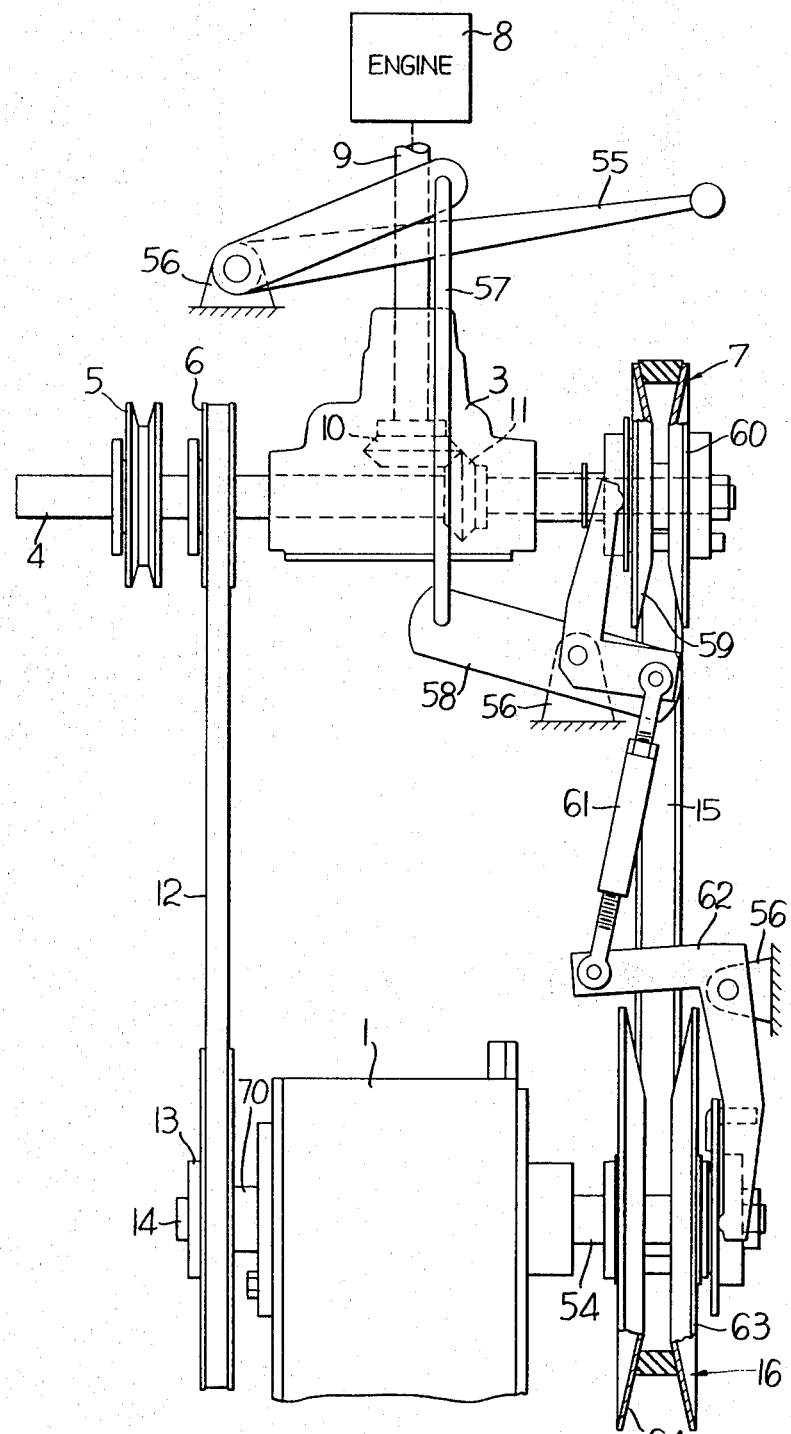

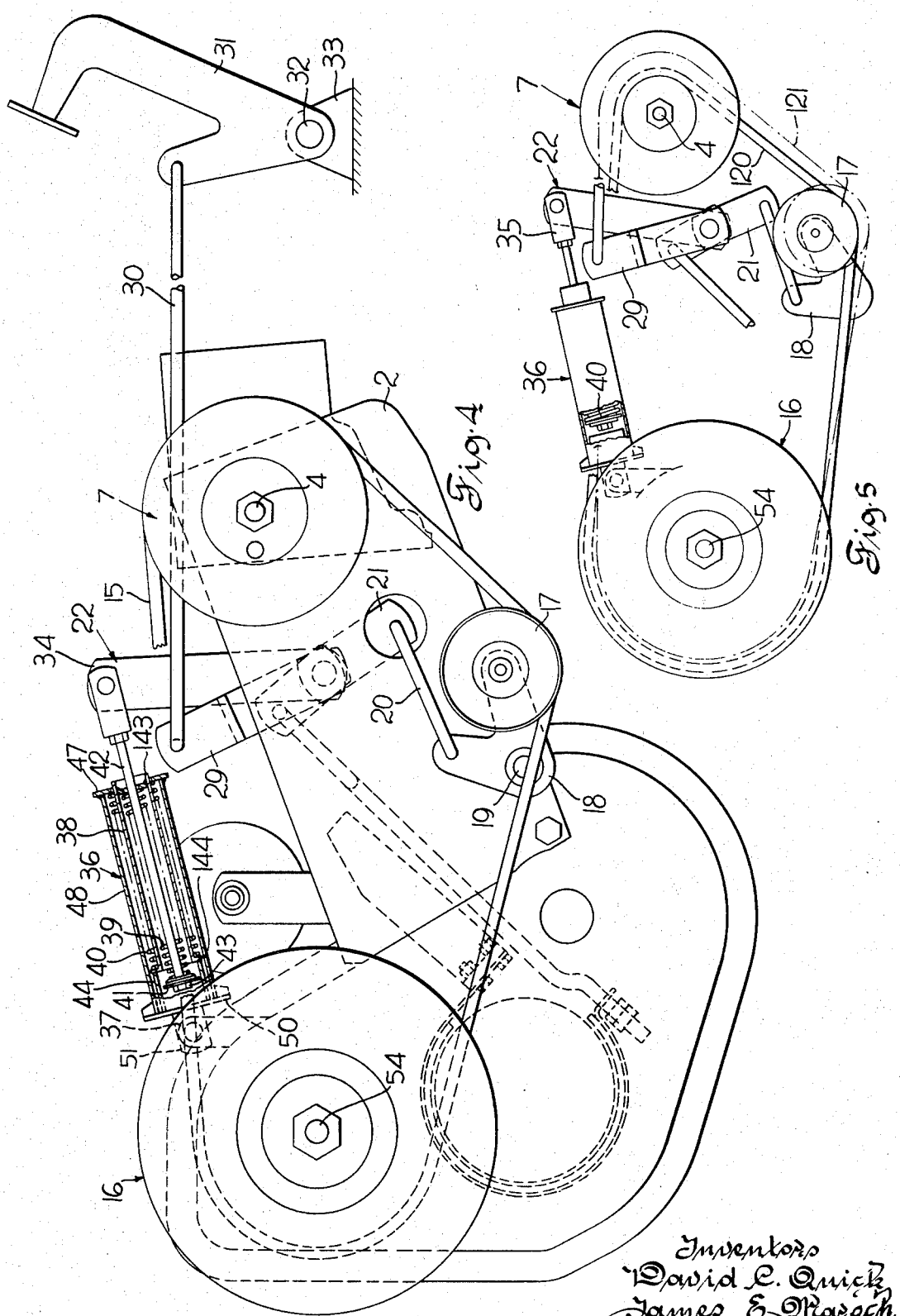

United States Patent Office 3,538,789
Patented Nov. 10, 1970

3,538,789
TRANSMISSION CONTROL
David C. Quick, New Berlin, and James E. Marsch, West Allis, Wis., assignors to Allis-Chalmers Manufacturing Company, Milwaukee, Wis.
Filed Oct. 1, 1968, Ser. No. 764,087
Int. Cl. F16h 37/02, 7/12; F16d 67/00
U.S. Cl. 74—689                                              10 Claims

ABSTRACT OF THE DISCLOSURE

A variable speed vehicle transmission having a constant speed input drive and a variable speed input drive with a mechanical linkage operating a variable speed belt drive with a tension control.

---

This invention relates to a vehicle transmission and more particularly to a transmission having a constant speed and a variable speed input belt drive to the transmission with means for tensioning of the belt.

Various types of transmissions are used on the conventional garden type tractor, lawn mower, tractor, swathers, or other vehicles. Most of these transmissions require a clutch for disengaging power transmission temporarily to allow the operator to shift from one gear to another. The use of the clutch in this type of a transmission is an added expense and increases the unit cost of the transmission and increases the number of working parts.

A variable speed belt drive transmission is also used which is economical, but not entirely satisfactory for reversing the direction of the drive.

Accordingly, this invention will provide a planetary gear transmission which will permit an infinite shifting of the speed from reverse through zero and to the top forward speed without disengaging power transmission. The transmission utilizes a variable speed belt drive. With this type of transmission there is an inherent increase in regenerative torque as the direction of belt tension changes and the transmission shifts through zero speed. This sudden or abrupt increase in regenerative torque transmitted through the variable speed belt requires an equally abrupt increase in belt tensioning to provide power transmission. Accordingly, this invention provides such a mechanism which will automatically increase the belt tensioning in this critical speed range.

It is an object of this invention to provide a control for a transmission using a planetary gear train with an input of a constant speed drive and a variable speed belt drive having automatic tensioning means.

It is another object of this invention to provide a variable speed belt drive and a constant speed belt drive to the input of a planetary gear train with an output drive connected to the planetary carrier and controlled tensioning on the belt drive to assure proper tensioning as the regenerative torque varies while shifting from forward to reverse.

It is a further object of this invention to provide a variable speed vehicle transmission having a constant speed and a variable speed input drive to drive the sun gear and the ring gear in opposite directions and have a belt tensioning means on the variable speed input to compensate for regenerative torque on the variable speed drive which is produced in a planetary gear train when the transmission speed range and/or direction is shifted.

The objects of this invention are accomplished by using a planetary gear train including two planetary gear sets the first of which the sun gear is driven by a constant speed belt driven shaft. The first planetary gear set provides a reduction of gear ratio and a reversal of the direction of the ring gear. A second planetary gear set is mounted coaxial with the first planetary gear set and the ring gears are integral with each other. A variable speed belt drive drives the sun gear of the second planetary gear set. The output of the planetary gear train is taken from the planetary carrier of the second planetary gear set to drive the vehicle drive through a reduction gear train. A mechanical linkage is used to vary the effective diameters of the sheaves carrying the variable speed belt drive. Also in combination with this mechanism is an automatic tensioning device which will abruptly increase the belt tension to prevent slippage of the variable speed belt when the transmission is shifted from the forward to the reverse range where regenerative torque is abruptly increased.

A preferred embodiment of this invention will be described in the subsequent paragraphs and is illustrated in the attached drawings, in which:

FIG. 3 is a view of the belt drive from the constant speed shaft to the planetary gear train;

FIG. 4 is a side elevation view of the vehicle transmission taken from the opposite side from that of FIG. 1;

FIG. 5 is a reduced scale side elevation view showing the belt and idler pulley and tensioner in the neutral and reverse position.

Figure 1:
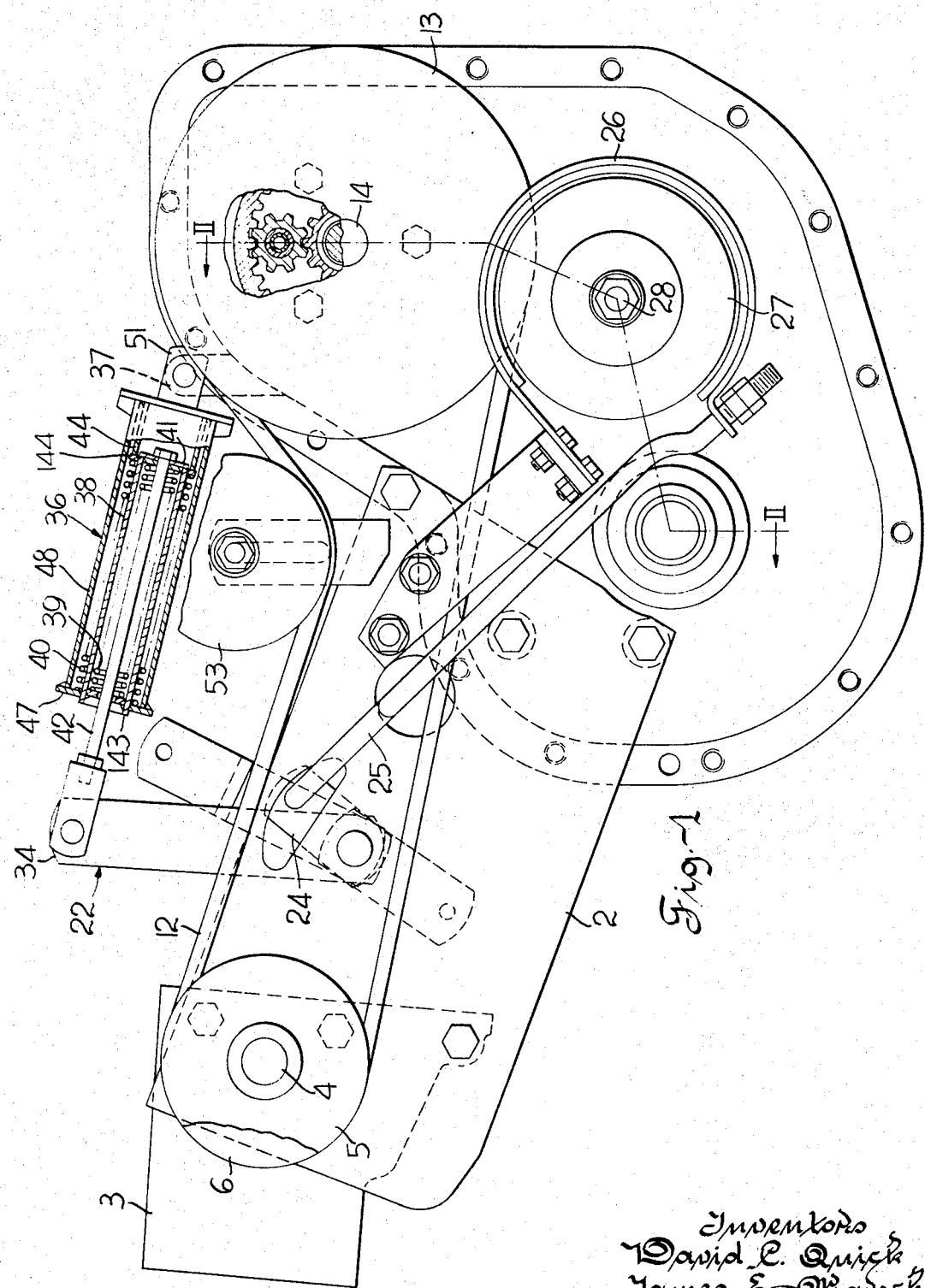
FIG. 1 illustrates a side elevation view of the transmission.

Referring to FIGS. 1 and 3 the transmission housing 1 is connected to a frame 2 which supports a gear casing 3. Drive shaft 4 carries a power take off pulley 5 and a constant speed drive sheave 6 and a variable speed drive sheave 7. The engine 8 drives the shaft 9 which carries the bevel gear 10 driving the bevel gear 11 which is mounted on the shaft 4.

The constant speed drive sheave 6 drives the belt 12 which is also carried on the constant speed driven sheave 13 which drives the constant speed input shaft 14 in the transmission. The variable speed drive sheave 7 carries the belt 15 which is carried on the variable speed driven sheave 16 and the idler tensioning sheave 17. Idler tensioning sheave 17 is carried on the bell crank 18 which is pivotally supported on the shaft 19 and pivotally connected to the rod 20. The rod 20 is connected to the arm 21 of lever 22. The lever 22 is pivotally mounted on the frame 2 and also has an arm 24 which is connected to the brake rod 25 which in turn operates the brake band 26. The brake band 26 frictionally engages the drum 27 mounted on the shaft 28 in the output reduction gear train in the transmission housing 1. The lever 22 also includes the arm 29 connected through the rod 30 to the brake pedal 31 which is pivotally supported on the shaft 32 and carried on the chassis 33. The arm 34 of lever 22 is pivotally connected to the clevis 35 on pushrod 42 of the tensioner 36 which is pivotally supported by the base 51 to the lug 51 on housing 1.

The tensioner 36 includes a cylinder 48 carrying a spring 40 and a sleeve 38 embracing spring 39. Spring 39 is compressed between the end plate 41 which is fastened to the rod 42 by the nut 43, and the retainer 143. A sleeve 44 encircles the end plate 41 and is received within the cylinder 48 and has a radial flange 144 for seating the spring 40. The flange 144 compresses the spring 40 against the annulus 47 and maintains the spring in a compressive state. The rod 42 initially compresses the spring 39 until the end plate 41 engages the radial flange 144 which in turn picks up spring 40 to compress the two springs simultaneously as the rod 42 extends farther from the tensioner 36. The cylinder 48 of tensioner 36 is fastened to the base 37 which is pivotally supported on the housing 1.

The constant speed drive shaft 4 drives the variable speed drive sheave 7 which in turn drives the V-belt 15 and the variable speed driven sheave 16. The driven sheave 16 is connected to a variable speed input drive shaft 54 rotatably carried on the transmission housing 1. The speed of the variable speed input drive is controlled by a control lever 55 pivotally supported on the chassis 56 and pivotally connected to the rod 57. The rod 57 is also pivotally connected to the lever 58 pivotally mounted on the chassis 56 which biases the half 59 to vary the spaced relation between it and the half 60 of the variable speed drive sheave 7. Simultaneously the rod 61 which is pivotally connected to the bell crank 62 which is pivotally mounted on the chassis 56 biases the half 63 to vary the space between the half 64 of the variable speed driven sheave 16. The variation of the effective sheave diameter of sheaves 7 and 16 are simultaneously controlled.

The constant speed input drive shaft 70 and the variable speed input drive shaft 54 drive the planetary gear train within the transmission housing 1. The direction of rotation of shaft 70 and 54 are opposite to each other and the relative speeds of these two shafts control the speed of the planetary carrier which is connected to gear 76 providing the output drive. The control lever 55 controls the speed of shaft 54, however it might equally well be designed to control the speed of the shaft 70 which also would provide a variable speed output and a reversal in direction of the output carrier. It is also understood that the control lever 55 might be connected to a linkage which would simultaneously change the effective diameter at either or both drive sheaves 6 and 7, or either or both driven sheaves 13 and 16.

Referring to FIG. 4, the variable speed sheaves 7 and 16 are shown in the position for providing forward drive to the transmissions. Shaft 54 is driven at a low speed. FIG. 5 shows the neutral position in phantom in which the output planetary carrier is stationary while the ring gear and the sun gear rotate at an equal rate of travel in gear tooth per minute.

The reverse position is also shown in FIG. 5 wherein the drive shaft 54 is rotating at a minimum rate and the ring gear drives the planetary carrier in a direction of rotation causing the planetary gear train to provide a reverse output drive.

Figure 2:
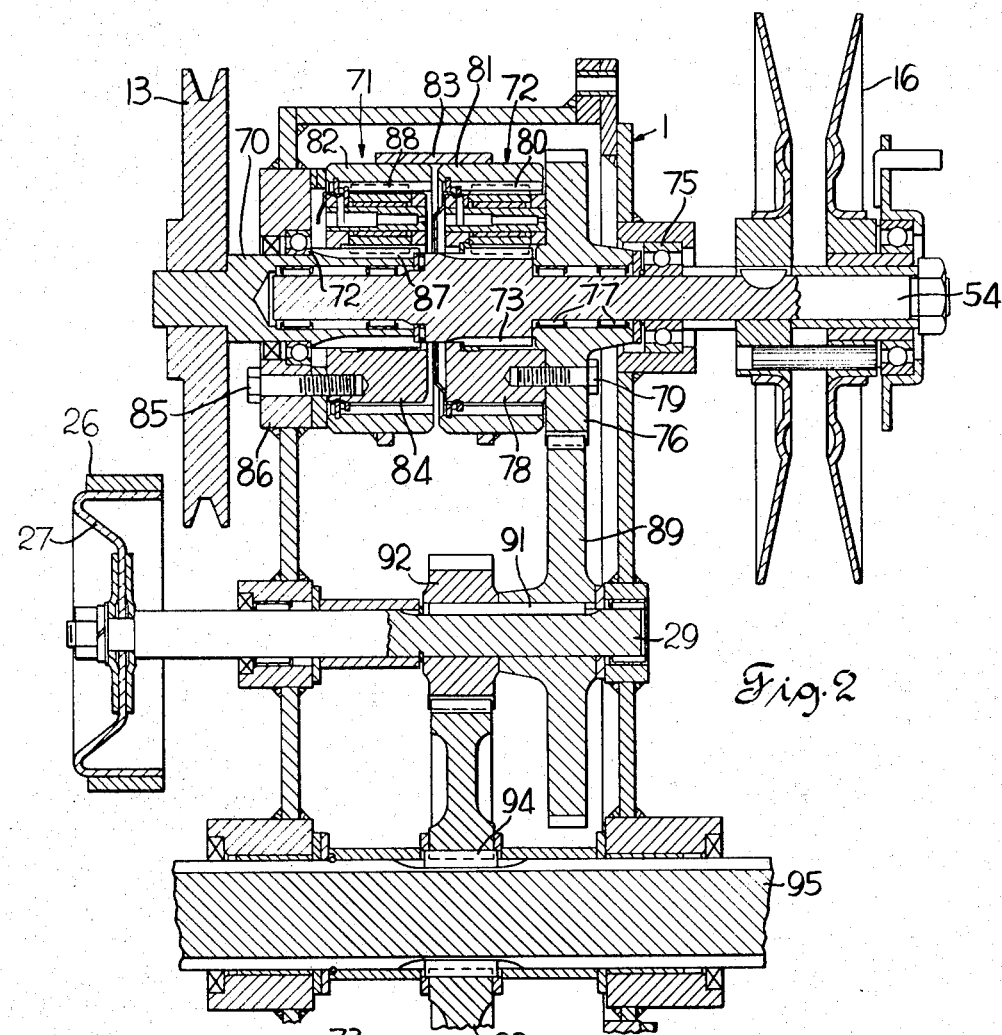
FIG. 2 is a cross section view taken along line II—II of FIG. 1.

FIG. 2 illustrates a cross section view taken along line II—II of FIG. 1. The constant speed drive sheave 13 drives a first planetary set 71. The first planetary gear set is connected for driving a second planetary gear set 72. A variable speed sheave 16 drives the shaft 54 which carries the sun gear 73. The shaft 54 is rotatably mounted with the bearing 75 in the housing 1. The planetary carrier 78 is bolted to the output spur gear 76 by means of the bolt 79. The planetary carrier 78 and gear 76 are rotatably mounted on the bearings 77 within a central opening of the spur gear 76. A plurality of planetary gears 80 are rotatably supported on the carrier 78 and mesh with the sun gear 73 as well as the ring gear 81 which is driven in the opposite direction to that of the sun gear 73. The ring gear 81 is fastened to the ring gear 82 by the annular strap 83.

The planetary carrier 84 of the first planetary set 71 is bolted by means of a bolt 85 to the carrier support 86 which is integral with the housing 1. The shaft 70 is rotatably mounted in the bearing assembly 72. As the shaft 70 drives the sun gear 87, the planetary gears 88 drive the ring gear 82 in the opposite direction at a reduced speed relative to the sun gear 87. Accordingly, it can be seen that the shaft 70 which is the constant speed input shaft, drives the sun gear which in turn provides the drive through the planetary gear set 71 for driving the ring gear 81. The relative speed and direction of the shafts 54 and 70 control the output direction and speed of the spur gear 76.

The spur gear 76 also drives the gear 89 which is keyed to the shaft 29 by key 91 which also keys the pinion gear 92 to the shaft 90. The pinion drives the gear 93 which is keyed by the key 94 to the final drive shaft 95. The shaft 29 also carries the brake drum 27 which engages the brake band 26 as shown in FIG. 1.

Figure 6:
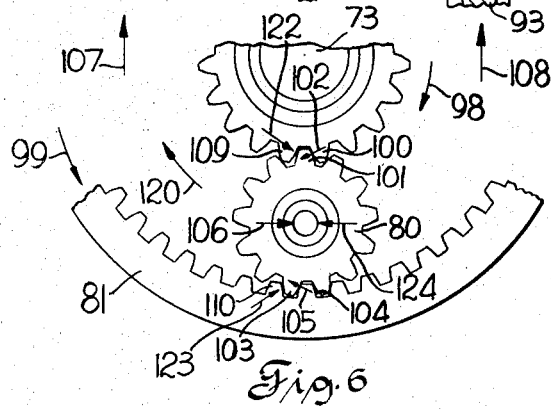
FIG. 6 illustrates a diagrammatic view of the forces in the planetary gear train.

Referring to FIG. 6, a limited illustration of the interacting forces in the planetary gear train is shown. Sun gear 73 drives the planetary gear 80 and ring gear 81 meshes with the planetary gear 80. The sun gear 73 drives in the direction of arrow 98 while the ring gear is driven in the direction of the arrow 99. If the sun gear 73 is driving at a faster rate of travel of gear teeth per minute than the ring gear 81 then the forces on the planetary gear 80 will be as shown. The force of tooth 100 of sun gear 73 will engage the tooth 101 of the planetary gear 80 in the direction of the arrow 102. Simultaneously the gear tooth 103 of the planetary gear 80 will be engaged by the gear tooth 104 of the ring gear 81 with a force in the direction of an arrow 105. A reaction force in the direction of the arrow 106 will be produced on the pin supporting the planetary gear 80. This in turn causes the planetary carrier to move in a direction opposite to that of arrow 106 as the planetary gear 80 and the carrier 78 are carried in the direction of arrow 120. The belt driving the sun gear will be pulling in the direction of arrow 107. When the situation exists as shown in FIG. 6 as described, the final drive is driven in the forward direction and a regenerative torque is transmitted back through the ring gear and through the constant speed drive belt 12 to the bevel gear set 10 and 11.

The reverse tension of the belt as shown in FIG. 6 by arrow 108 will exist when the ring gear 81 is rotating at a rate of travel of a greater number of teeth per minute than the sun gear 73. The planetary carrier is then driven in the direction of the rotation of the ring gear. This in turn will produce a force diagram opposite to that shown and described previously wherein the gear tooth 109 of the sun gear 73 will engage gear tooth 101 of the planetary gear 80 with a force in the direction of arrow 122. Also the tooth 110 of the ring gear 81 will engage tooth 103 of the planetary gear 80 in the direction of arrow 123 to produce a reaction force in the direction of arrow 124. The tension of the belt on the variable speed drive will be that shown by the arrow 108 and the regenerative force is transmitted back to the bevel gear sets 10 and 11.

The operation of the device will be described in the following paragraphs.

Referring to FIG. 2 and FIG. 3, the sheave 13 is driven at a constant speed by the belt 12 and the drive sheave 6 carried on the constant speed drive shaft 4. The sheave 13 drives the shaft 70 and sun gear 87, the planetary gears 88, and tre ring gear 82 in the first planetary gear set 71. The planetary gear set 71 provides a reduction in the drive ratio and also reverses the direction of rotation for the ring gear 82. The ring gear 82 is integral with the ring gear 81 and accordingly the ring gear 81 in the second planetary gear set 72 also is driven in the same direction.

The constant speed drive shaft 4 also drives the variable speed drive sheave 7, the belt 15 and the driven sheave 16. The speed of the shaft 54 is varied in response to the control mechanism. The drive shaft 54 drives the sun gear 73 in the direction opposite from the ring gear 81 which drives the planetary gear 80 and rotates the carrier 78 which is bolted to the output gear 76. The relative speed of the ring gear 81 and the sun gear 73 control the speed and direction of the carrier 78 which provides the output from the planetary gear train.

Referring to FIG. 3, as the lever 55 is pivoted the levers 58 and 62 pivot are pivoted, which simultaneously control the effective diameter of the sheaves 7 and 16. When the lever 55 is pivoted upward, the lever 58 causes the belt to ride higher in the groove of the drive sheave 7 and lever 62 permits the belt to ride deeper in the groove of sheave 16, and the speed of the sun gear 73 is increased as shown in FIG. 4. The transmission in this position is driving in the forward direction and the tensioner is operating on the single spring 39. In other words, the bell crank 18 pivots downwardly biasing the idler pulley 17 against the belt as shown in FIG. 4 permitting the retraction of the spring retainer 41 as the lever 22 pivots in the counterclockwise direction.

FIG. 6 illustrates the reaction of the planetary gears with the sun gear 73 and the ring gear 81 which changes the tension on the belt.

As the control lever 55 is pivoted downwardly as shown in FIG. 3, the variable speed drive sheave 7 permits the belt to ride deeper in the groove while the lever 62 causes the variable speed driven sheave 16 to force the belt radially outward in the groove and the speed ratio is changed to a position as indicated by the phantom lines of the belt 121 in FIG. 5. This position is the neutral position of the transmission, in other words the position in which the planetary carrier 78 remains stationary and the ring gear and sun gear causes the planetary gears to merely rotate on stationary centers.

A further pivotal downward movement of the control lever 55 will cause the effective diameter of the drive sheaves 7 to decrease while the effective diameter of the driven sheave 16 will increase to a point as shown by the solid lines 120 of the belt. In this position, the transmission is operating in reverse and the tensioning device will be as sown in FIG. 1 wherein the end plate 41 engages the flange 144 causing a compression of both the springs 39 and 40. The bell crank 18 pivots upwardly against the force springs 39 and 40 of the tensioner 36 which abruptly increases the belt tension. The brake pedal 31 although connected to the linkage, rides along as the increase in tension is exerted by the springs. If the brake pedal 31 is depressed however, it will continue the pivotal movement of the lever 22 causing the brake band 26 to engage the brake drum 27.

Referring to FIG. 6 this abrupt change in regenerative torque is illustrated. With the sun gear 73 driving at a faster relative rate with respect to the ring gear 81 the condition illustrated in FIG. 6 shows the tensioning in the direction of the arrow 107. This tensioning maintains belt contact and permits feedback of the regenerative force through the constant speed belt 12. When the transmission shifts to neutral and into reverse, the tensioning of the belt shifts from the direction as shown by arrow 107 to the direction by arrow 108. This in turn alters the force diagram causing the regenerative torque to feed back through the belt 15 operating on the variable speed drive in the direction of arrow 108. The sudden increase in regenerative torque fed back through the belt 15 requires a sudden increase in belt tensioning which is provided automatically by the tensioner 36.

As previously described, the constant speed drive belt 12 is tensioned manually by the idler pulley 53 which can be moved upwardly or downwardly as indicated to provide the proper tensioning in the belt.

A modification of the control linkages shown in FIG. 3 may be provided by connecting the lever 58 to the base end of the tensioner cylinder 36. As the lever is moved downwardly for shifting the transmission into the reverse position, the tensioning force of the tensioner 36 would be increased and vice versa.

The embodiments of the invention in which an exclusive property or privilege is claimed are defined as follows:

1. A vehicle transmission having an infinitely variable speed output comprising, a planetary gear train including a sun gear, a ring gear and at least one planet gear mounted on a planetary carrier, a drive sheave connected by a belt to a driven sheave driving said sun gear of said planetary gear train, a second drive sheave connected by a belt to a second driven sheave driving said ring gear of said planetary gear train in the opposite direction relative to said sun gear, speed control means varying the effective diameter of frictional engagement of said belt on at least one of said drive and driven sheaves varying the rate of angular rotation of said one of said driven sheaves to control the speed and direction of rotation of said planetary carrier, a belt tensioning device including an idler pulley movably supported for engaging the periphery of the belt driving said driven sheave at a variable speed, a tensioner connected to said idler pulley including resilient means producing a low force and high force range biasing said idler pulley against said belt to vary the tension on the belt driving said variable speed driven sheave when said planetary carrier changes its rate of rotation and thereby compensate for varying torque fed back through said belt.

2. A vehicle transmission as set forth in claim 1 wherein said tensioner includes a spring means for varying the force rate for tensioning of said belt.

3. A vehicle transmission as set forth in claim 1 wherein said tensioner includes a first spring normally tensioning said belt for driving said driven sheave at a variable speed and a second spring augmenting the force of the first spring when said planetary carrier reverses its direction of rotation and abruptly increases the regenerative torque transmitted through said belt.

4. A vehicle transmission as set forth in claim 1 wherein said speed control means includes a lever pivotally supported on said transmission, means connected to said lever and said sheave for varying the effective diameter of said driven sheave while said lever is pivoting through positions defining the forward, neutral and reverse rotation of said carrier of said transmission.

5. A vehicle transmission as set forth in claim 1 including a brake lever and a brake for braking said carrier, another lever operatively connected to said idler pulley and said brake lever, said brake lever reducing the biasing force on said idler pulley when said brake is actuated.

6. A vehicle transmission as set forth in claim 1 wherein said speed control means for varying the effective diameters of said drive sheaves and said driven sheaves includes means changing the effective diameter of both the drive and driven sheaves, a brake for braking said carrier, a linkage connecting said idler pulley with said tensioner transmitting an increased reaction force from said tensioner when said planetary carrier reverses its direction and creates regenerative torque transmitted through said belt to the drive sheave.

7. A vehicle transmission as set forth in claim 1 wherein said tensioner includes two compression springs increasing the reaction force of said tensioner when the direction of carrier rotation is reversed.

8. A vehicle transmission as set forth in claim 1 including a pivotal support supporting said idler pulley, a lever pivotally connecting said tensioner with said pulley to increase the tensioner reaction force and the frictional force on the drive and driven sheaves when said planetary carrier changes direction.

9. A vehicle transmission as set forth in claim 1 wherein said tensioning device includes a first spring and a second spring operating singularly or jointly whereby one spring tensions the belt for forward rotation of the planetary carrier, means activating both springs when the planetary carrier operates in reverse rotation.

10. A vehicle transmission as set forth in claim 1 wherein said speed control means varying the speed of rotation of said one driven sheave includes means simultaneously radially shifting the belt position on said one driven sheave, said tensioning device including a pivoting support adjacent said one driven sheave for supporting said pulley to abruptly increase the belt friction when the planetary carrier changes the direction from forward rotation to reverse rotation.

References Cited

UNITED STATES PATENTS

| | | | |
|---|---|---|---|
| 1,112,586 | 10/1914 | Allen | 74—689 |
| 1,501,705 | 7/1924 | Decoux | 74—230.17 |
| 2,047,840 | 7/1936 | Twomley | 74—689 |
| 2,245,392 | 6/1941 | Drill | 74—689 |
| 2,302,483 | 11/1942 | Welty | 74—230.17 |
| 2,359,526 | 10/1944 | Locke | 74—689 |
| 2,742,794 | 4/1956 | Vogelsang | 74—230.17 |
| 3,068,677 | 12/1962 | Buss | 74—230.17 X |
| 3,267,760 | 8/1966 | Wenning | 74—230.17 |

MARK M. NEWMAN, Primary Examiner

THOMAS C. PERRY, Assistant Examiner

U.S. Cl. X.R.

74—230.17, 242.9; 192—10